United States Patent
LeCrone et al.

(10) Patent No.: US 10,678,466 B2
(45) Date of Patent: Jun. 9, 2020

(54) DATA MIGRATION WITH WRITE BACK TO SOURCE

(71) Applicant: EMC IP Holding Company LLC, Hopkinton, MA (US)

(72) Inventors: Douglas E. LeCrone, Hopkinton, MA (US); Martin Feeney, Medway, MA (US); Jeffrey L. Jones, Fort Lauderdale, FL (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/176,545

(22) Filed: Oct. 31, 2018

(65) Prior Publication Data

US 2020/0133556 A1 Apr. 30, 2020

(51) Int. Cl.
*G06F 12/00* (2006.01)
*G06F 3/06* (2006.01)

(52) U.S. Cl.
CPC ............ *G06F 3/0647* (2013.01); *G06F 3/061* (2013.01); *G06F 3/0659* (2013.01); *G06F 3/0683* (2013.01)

(58) Field of Classification Search
CPC ...... G06F 3/0647; G06F 3/061; G06F 3/0659; G06F 3/0683
See application file for complete search history.

(56) References Cited

U.S. PATENT DOCUMENTS

2005/0193167 A1* 9/2005 Eguchi .................... G06F 3/061
711/114

* cited by examiner

*Primary Examiner* — Shawn X Gu
(74) *Attorney, Agent, or Firm* — Muirhead and Saturnelli, LLC

(57) ABSTRACT

Migrating data from a first storage device to a second storage device includes coupling a host computer to the storage devices, causing the host computer to transition from performing I/O operations with the first storage device to performing I/O operations with the second storage device by modifying metadata used for I/O operations to change a mapping of logical devices to physical devices, migrating data from the first storage device to the second storage device independently of any I/O operations by the host, and acknowledging a data write operation from the host only after the data has been successfully written to both the first storage device and the second storage device. Modifying metadata may include changing control block information in device drivers. The data may be written by the host to the second storage device only and the data may be copied from the second storage device to the first storage device.

18 Claims, 6 Drawing Sheets

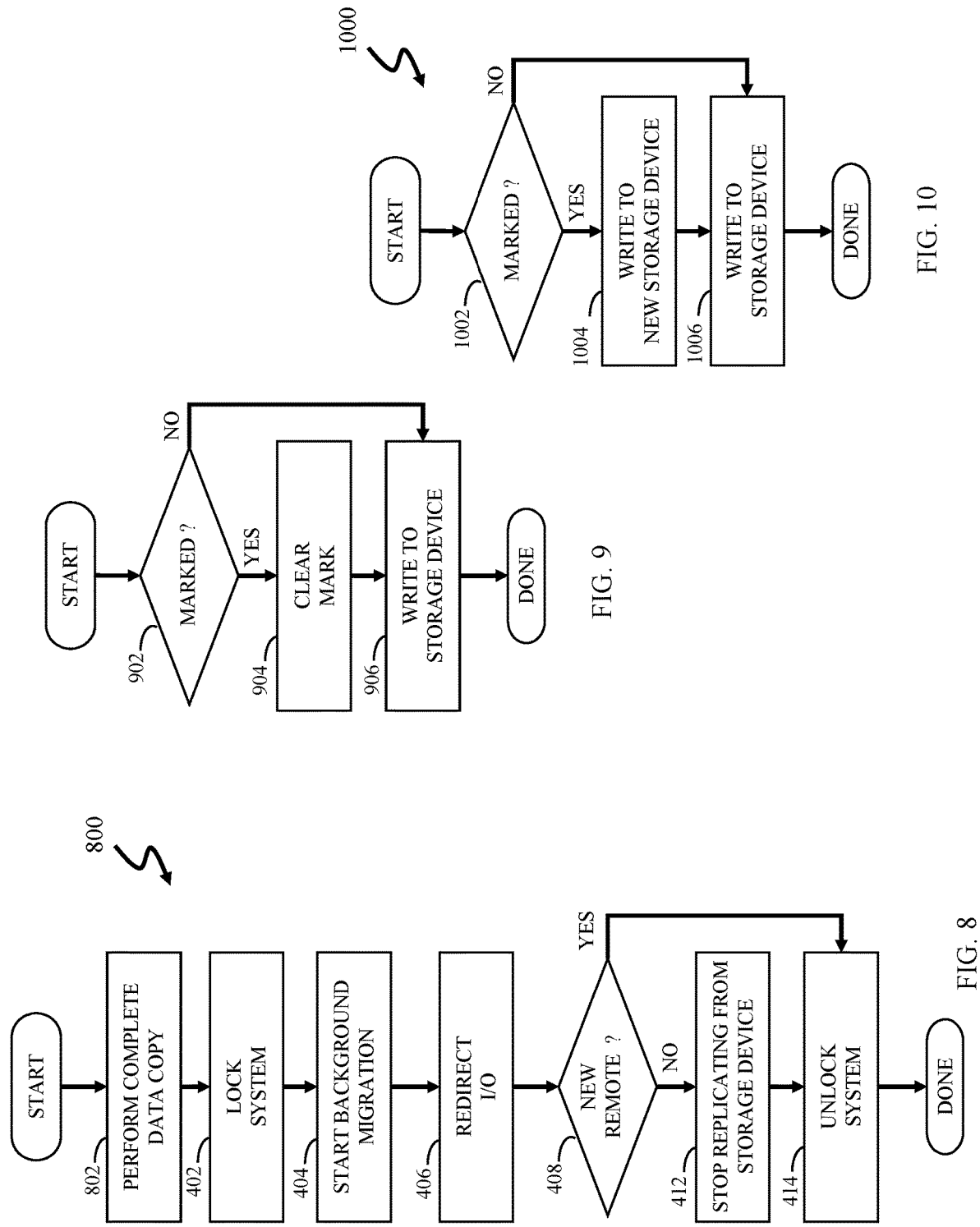

DATA MIGRATION WITH WRITE BACK TO SOURCE

TECHNICAL FIELD

This application relates to the field of computer systems and storage devices therefor and, more particularly, to the field of storage access and I/O operations among computing systems and storage devices.

BACKGROUND OF THE INVENTION

Host processor systems may store and retrieve data using a storage device containing a plurality of host interface units (I/O modules), disk drives, and disk interface units (disk adapters). The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to any one of the actual disk drives. Allowing multiple host systems to access the single storage device unit allows the host systems to share data stored therein.

In some cases, it is desirable to replace a storage device with a new storage device without pausing or disrupting operation of a host while maintaining a disaster recovery position in which the host can resume operation if either of the storage device or the new storage device fails during the migration. A system for doing this is disclosed, for example, in U.S. Pat. No. 7,685,129 to LeCrone, et al., which teaches performing data migration without disrupting operation of the host. However, that system and similar systems use the host to read data from the storage device and write the data to the new storage device, which means that a significant amount of the data being migrated passes through the host. In some cases, this may be impractical (due to the volume of data) or at least less than optimal for a particular situation.

Accordingly, it is desirable to be able to migrate data from a storage device to a new storage device without disrupting host operations while always maintaining a disaster recovery position in a way that does not require a significant amount of data to pass through the host.

SUMMARY OF THE INVENTION

According to the system described herein, migrating data from a first storage device to a second storage device includes coupling a host computer to the first storage device and the second storage device, causing the host computer to transition from performing I/O operations with the first storage device to performing I/O operations with the second storage device by modifying metadata used for I/O operations to change a mapping of logical devices to physical devices, migrating data from the first storage device to the second storage device independently of any I/O operations by the host, and acknowledging a data write operation from the host only after the data has been successfully written to both the first storage device and the second storage device. Modifying metadata may include changing control block information in device drivers. The data may be written by the host to both the first storage device and the second storage device. The data may be written by the host to the second storage device only and the data may be copied from the second storage device to the first storage device. Other data from a portion of a same area of the first storage device may be copied from the first storage device to the second storage device prior to the host writing the data to the second storage device. Copying the other data may be performed in connection with migrating the data from the first storage device to the second storage device. Copying the other data may be performed independently of migrating the data from the first storage device to the second storage device. The portion may be a track. The portion may be locked prior to copying the other data. The portion may be unlocked following acknowledging the data write operation.

According further to the system described herein, a non-transitory computer readable medium contains software that migrates data from a first storage device to a second storage device that are both coupled to a host computer. The software includes executable code that causes the host computer to transition from performing I/O operations with the first storage device to performing I/O operations with the second storage device by modifying metadata used for I/O operations to change a mapping of logical devices to physical devices, executable code that migrates data from the first storage device to the second storage device independently of any I/O operations by the host, and executable code that acknowledges a data write operation from the host only after the data has been successfully written to both the first storage device and the second storage device. Modifying metadata may include changing control block information in device drivers. The data may be written by the host to both the first storage device and the second storage device. The data may be written by the host to the second storage device only and the data may be copied from the second storage device to the first storage device. Other data from a portion of a same area of the first storage device may be copied from the first storage device to the second storage device prior to the host writing the data to the second storage device. Copying the other data may be performed in connection with migrating the data from the first storage device to the second storage device. Copying the other data may be performed independently of migrating the data from the first storage device to the second storage device. The portion may be a track. The portion may be locked prior to copying the other data. The portion may be unlocked following acknowledging the data write operation.

According further to the system described herein, migrating data from a first storage device to a second storage device includes causing all data of the first storage device to be copied from the first storage device to the second storage device, coupling a host computer to the first storage device and the second storage device, causing the host computer to transition from performing I/O operations with the first storage device to performing I/O operations with the second storage device by modifying metadata used for I/O operations to change a mapping of logical devices to physical devices only after causing all data of the first storage device to be copied from the first storage device to the second storage device, migrating data from the first storage device to the second storage device independently of any I/O operations by the host, and acknowledging a data write operation from the host only after the data has been successfully written to both the first storage device and the second storage device. Modifying metadata may include changing control block information in device drivers. The data may be written by the host to both the first storage device and the second storage device. The data may be written by the host to the second storage device only and the data may be copied from the second storage device to the first storage device. Other data from a portion of a same area of the first storage device may be copied from the first storage device to the second storage device prior to the host writing the data to the second storage device. Copying the other data may be performed in connection with migrating the data from the first storage device to the second storage device. Copying the other data may be performed independently of migrating the data from the first storage device to the second storage device. The portion may be a track. The portion may be locked prior to copying the other data. The portion may be unlocked following acknowledging the data write operation.

According further to the system described herein, a non-transitory computer readable medium contains software that migrates data from a first storage device to a second storage device that are both coupled to a host computer. The software includes executable code that causes all data of the first storage device to be copied from the first storage device to the second storage device, executable code that causes the host computer to transition from performing I/O operations with the first storage device to performing I/O operations with the second storage device by modifying metadata used for I/O operations to change a mapping of logical devices to physical devices, executable code that migrates data from the first storage device to the second storage device independently of any I/O operations by the host only after causing all data of the first storage device to be copied from the first storage device to the second storage device, and executable code that acknowledges a data write operation from the host only after the data has been successfully written to both the first storage device and the second storage device. Modifying metadata may include changing control block information in device drivers. The data may be written by the host to both the first storage device and the second storage device. The data may be written by the host to the second storage device only and the data may be copied from the second storage device to the first storage device. Other data from a portion of a same area of the first storage device may be copied from the first storage device to the second storage device prior to the host writing the data to the second storage device. Copying the other data may be performed in connection with migrating the data from the first storage device to the second storage device. Copying the other data may be performed independently of migrating the data from the first storage device to the second storage device. The portion may be a track. The portion may be locked prior to copying the other data. The portion may be unlocked following acknowledging the data write operation.

BRIEF DESCRIPTION OF THE DRAWINGS

Embodiments of the system are described with reference to the several figures of the drawings, noted as follows.

FIG. 8 is a flow diagram illustrating processing performed in connection with copying data from a source to a target before setting up a system to begin migrating data according to an embodiment of the system described herein.

FIG. 9 is a flow diagram illustrating processing performed in connection with writing data to a storage device prior to migrating data according to an embodiment of the system described herein.

FIG. 10 is a flow diagram illustrating processing performed in connection with writing data to a storage device prior to migrating data according to an alternative embodiment of the system described herein.

DETAILED DESCRIPTION OF VARIOUS EMBODIMENTS

Figure 1:
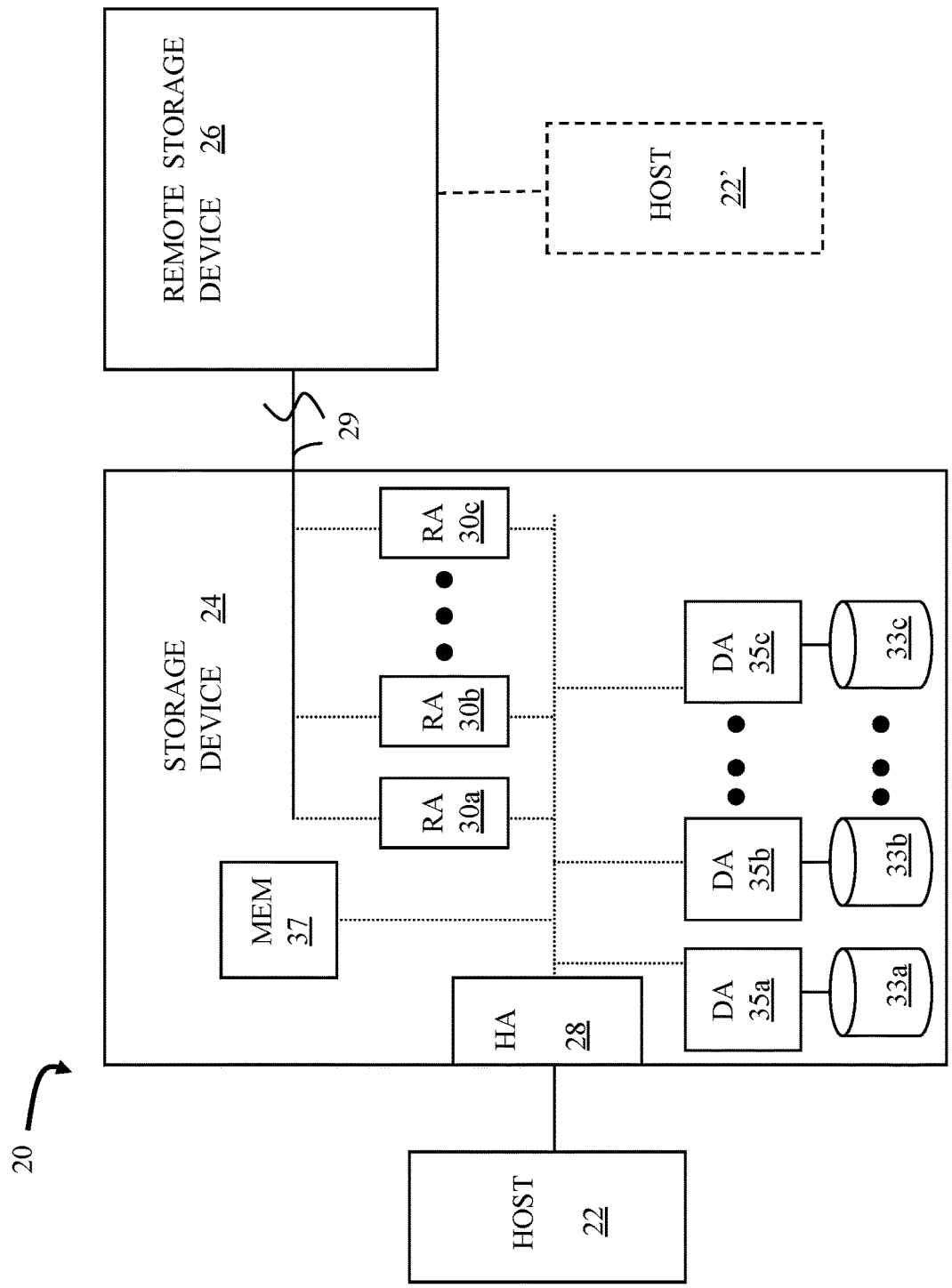
FIG. 1 is a schematic illustration of a storage system showing a relationship between a host and a storage device that may be used in connection with an embodiment of the system described herein.

FIG. 1 is a schematic illustration of a storage system 20 showing a relationship between a host 22 and a storage device 24 that may be used in connection with an embodiment of the system described herein. In an embodiment, the storage device 24 may be a Symmetrix or VMAX storage system produced by Dell EMC of Hopkinton, Mass.; however, the system described herein may operate with other appropriate types of storage devices. Also illustrated is another (remote) storage device 26 that may be similar to, or different from, the storage device 24 and may, in various embodiments, be coupled to the storage device 24, for example, via a network. The host 22 reads and writes data from and to the storage device 24 via an HA 28 (host adapter), which facilitates an interface between the host 22 and the storage device 24. Although the diagram 20 only shows one host 22 and one HA 28, it will be appreciated by one of ordinary skill in the art that multiple host adaptors (possibly of different configurations) may be used and that one or more HAs may have one or more hosts coupled thereto.

In an embodiment of the system described herein, in various operations and scenarios, data from the storage device 24 may be copied to the remote storage device 26 via a link 29. For example, the transfer of data may be part of a data mirroring or replication process that causes data on the remote storage device 26 to be identical to the data on the storage device 24. Although only the one link 29 is shown, it is possible to have additional links between the storage devices 24, 26 and to have links between one or both of the storage devices 24, 26 and other storage devices (not shown). The storage device 24 may include a first plurality of remote adapter units (RA's) 30a, 30b, 30c. The RA's 30a-30c may be coupled to the link 29 and be similar to the HA 28, but are used to transfer data between the storage devices 24, 26.

The storage device 24 may include one or more disks (including solid state storage), each containing a different portion of data stored on the storage device 24. FIG. 1 shows the storage device 24 having a plurality of disks 33a-33c. The storage device (and/or remote storage device 26) may be provided as a stand-alone device coupled to the host 22 as shown in FIG. 1 or, alternatively, the storage device 24 (and/or remote storage device 26) may be part of a storage area network (SAN) that includes a plurality of other storage devices as well as routers, network connections, etc. (not shown). The storage devices may be coupled to a SAN fabric and/or be part of a SAN fabric. The system described herein may be implemented using software, hardware, and/or a combination of software and hardware where software may be stored in a computer readable medium and executed by one or more processors.

Each of the disks 33a-33c may be coupled to a corresponding disk adapter unit (DA) 35a-35c that provides data to a corresponding one of the disks 33a-33c and receives data from a corresponding one of the disks 33a-33c. An internal data path exists between the DA's 35a-35c, the HA 28 and the RA's 30a-30c of the storage device 24. Note that, in other embodiments, it is possible for more than one disk to be serviced by a DA and that it is possible for more than one DA to service a disk. The storage device 24 may also include a global memory 37 that may be used to facilitate data transferred between the DA's 35a-35c, the HA 28 and the RA's 30a-30c as well as facilitate other operations. The memory 37 may contain task indicators that indicate tasks to be performed by one or more of the DA's 35a-35c, the HA 28 and/or the RA's 30a-30c, and may contain a cache for data fetched from one or more of the disks 33a-33c.

The storage space in the storage device 24 that corresponds to the disks 33a-33c may be subdivided into a plurality of volumes or logical devices. The logical devices may or may not correspond to the physical storage space of the disks 33a-33c. Thus, for example, the disk 33a may contain a plurality of logical devices or, alternatively, a single logical device could span both of the disks 33a, 33b. Similarly, the storage space for the remote storage device 26 may be subdivided into a plurality of volumes or logical devices, where each of the logical devices may or may not correspond to one or more disks of the remote storage device 26.

In some embodiments, an other host 22' may be provided. The other host 22' is coupled to the remote storage device 26 and may be used for disaster recovery so that, upon failure at a site containing the host 22 and the storage device 24, operation may resume at a remote site containing the remote storage device 26 and the other host 22'. In some cases, the host 22 may be directly coupled to the remote storage device 26, thus protecting from failure of the storage device 24 without necessarily protecting from failure of the host 22.

Figure 2:
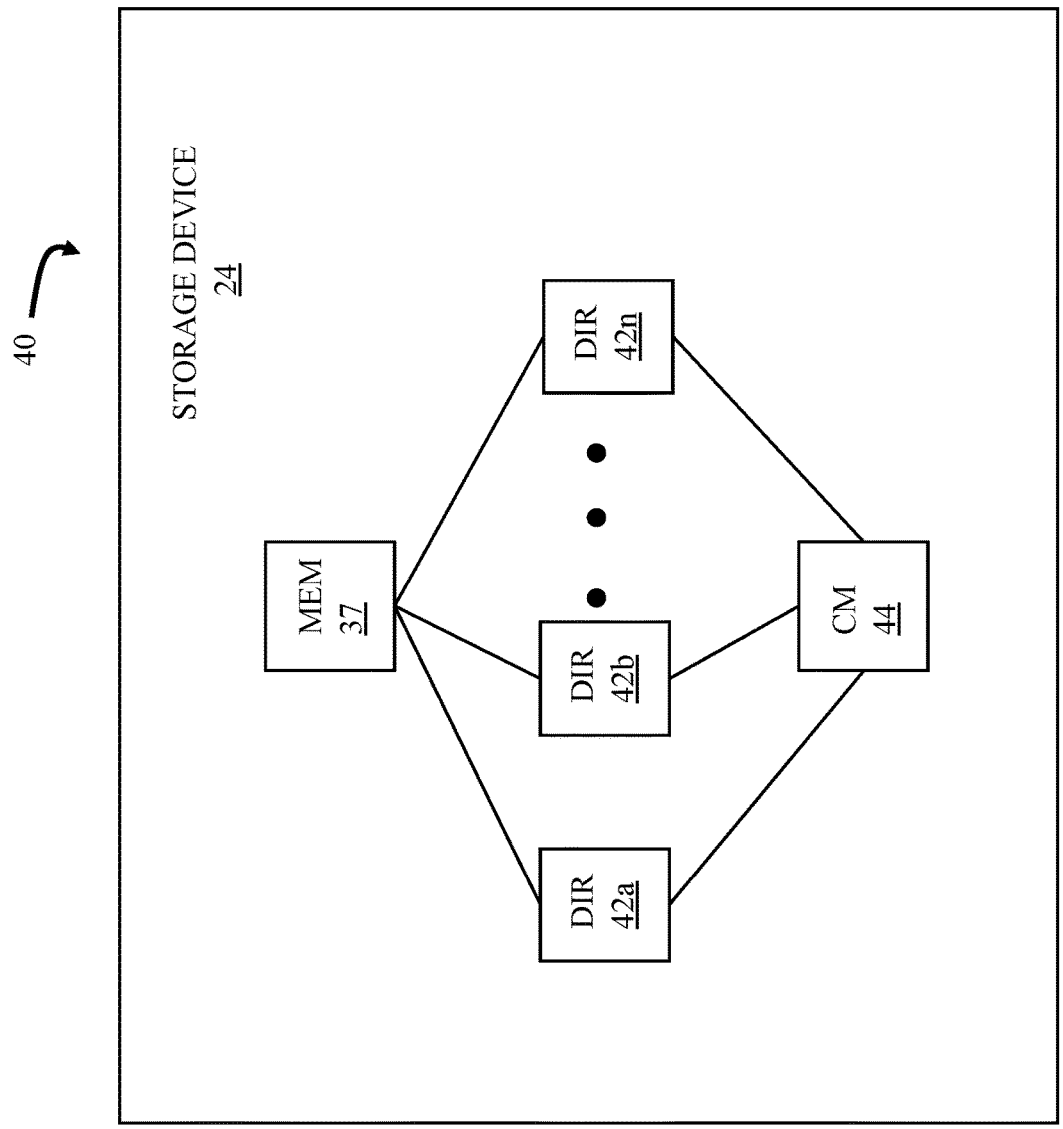
FIG. 2 is a schematic diagram illustrating an embodiment of the storage device where each of a plurality of directors are coupled to the memory according to an embodiment of the system described herein.

FIG. 2 is a schematic diagram 40 illustrating an embodiment of the storage device 24 where each of a plurality of directors 42a-42n are coupled to the memory 37. Each of the directors 42a-42n represents at least one of the HA 28, RAs 30a-30c, or DAs 35a-35c. The diagram 40 also shows an optional communication module (CM) 44 that provides an alternative communication path between the directors 42a-42n. Each of the directors 42a-42n may be coupled to the CM 44 so that any one of the directors 42a-42n may send a message and/or data to any other one of the directors 42a-42n without needing to go through the memory 37. The CM 44 may be implemented using conventional MUX/router technology where one of the directors 42a-42n that is sending data provides an appropriate address to cause a message and/or data to be received by an intended one of the directors 42a-42n that is receiving the data. Some or all of the functionality of the CM 44 may be implemented using one or more of the directors 42a-42n so that, for example, the directors 42a-42n may be interconnected directly with the interconnection functionality being provided on each of the directors 42a-42n. In addition, one of the directors 42a-42n may be able to broadcast a message to all of the other directors 42a-42n at the same time.

In some embodiments, one or more of the directors 42a-42n may have multiple processor systems thereon and thus may be able to perform functions for multiple directors. In some embodiments, at least one of the directors 42a-42n having multiple processor systems thereon may simultaneously perform the functions of at least two different types of directors (e.g., an HA and a DA). Furthermore, in some embodiments, at least one of the directors 42a-42n having multiple processor systems thereon may simultaneously perform the functions of at least one type of director and perform other processing with the other processing system. In addition, all or at least part of the global memory 37 may be provided on one or more of the directors 42a-42n and shared with other ones of the directors 42a-42n. In an embodiment, the features discussed in connection with the storage device 24 may be provided as one or more director boards having CPUs, memory (e.g., DRAM, etc.) and interfaces with Input/Output (I/O) modules.

Figure 3:
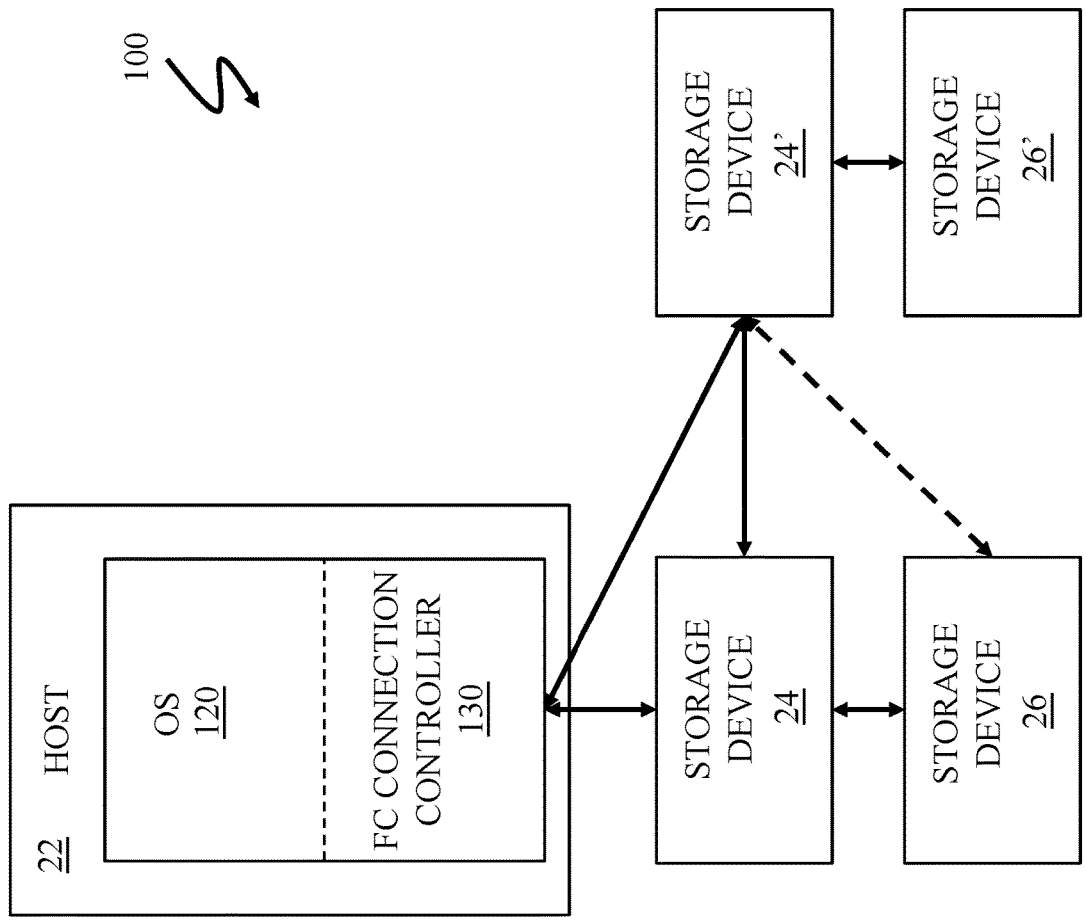
FIG. 3 is a schematic illustration showing a system with a host, a storage device, and a remote storage device according to an embodiment of the system described herein.

FIG. 3 is a schematic illustration showing a system 100 with a FICON connection controller 130 for providing FICON connection between the host 22 and the storage device 24 according to an embodiment of the system described herein. In an embodiment, the host 22 may be a computer running Linux, z/OS or some other appropriate operating system 120. I/O processing on the host 22 may operate with the FICON connection controller 130 to enable I/O operations with the storage device 24. The FICON connection controller 130 may send and receive data to and from the storage device 24 using any appropriate connection mechanism that may include a network (such as the Internet, and appropriate connection thereof). The remote storage device 26 is coupled to the storage device 24 to receive data therefrom. In an embodiment herein, the remote storage device 26 contains a synchronous copy of data written to the storage device 24 by the host 22 (or possibly the other host 22', see discussion elsewhere herein); a write from the host 22 to the storage device 24 is not acknowledge by the storage device 24 unless and until the data has been successfully written from the storage device 24 to the remote storage device 26. Thus, the remote storage device 26 may serve as disaster recovery storage for the system 100 so that if the storage device 24 fails, operation may be resumed by the host 22 using the remote storage device 26. Note that the remote storage device 26 may serve as disaster recovery storage for the system even in instances where data transfer between the storage device 24 and the remote storage device 26 is asynchronous. See, for example, U.S. Pat. No. 9,558,083 to LeCrone, et al., which is incorporated by reference herein.

The FICON connection controller 130 may act as an I/O subsystem providing FICON communication capability. The storage device 24 may include features and/or components enabling the Fibre channel communication with the host 22. For a discussion of features and implementations of FICON systems and suitable Fibre channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference. Similarly, the storage device 24 and the remote storage device 26 may be coupled using any appropriate mechanism, such as FICON, the Internet, etc. It is noted that various components of the system 100 may be emulated. For further discussion of emulation of I/O computing components, in particular Fibre Channel connection components, reference is made to U.S. Pat. No. 9,665,502 to Jones et al., entitled "Virtual I/O Hardware" and U.S. Pat. No. 9,170,984 to LeCrone et al., entitled "I/O Fault Injection Using Simulated Computing Environments," which are both incorporated herein by reference.

The connection mechanism between the host 22 and the data storage device 24 may include an Internet connection and/or possibly some other type(s) of connection(s). In an embodiment herein, the connection mechanism may be directly incompatible with a FICON connection on at least one end of the connection and thus may rely on a FICON emulator (and/or other emulator(s)) for providing data in an appropriate format. It is further noted that where FICON emulation is being performed, the storage device 24 may include or be coupled to a FICON emulator that may send and receive data to and from the connection mechanism that also emulates a Fibre Channel FC0 physical layer for the benefit of the storage device 24. Thus, in such case involving emulation, both the host 22 and the storage device 24 may operate as if the devices 22, 24 were communicating directly using a FICON hardware connection.

Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols. Note also that it is possible for the storage device 24 to emulate a host in connection with transferring data to the remote storage device 26 so that the remote storage device 26 operates in a same way as if the remote storage device 26 were connected directly to a host.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

The system 100 also includes a new storage device 24' and, optionally, a new remote storage device 26'. In an embodiment herein, it is desirable to migrate data from the storage device 24 to the new storage device 24' and replace the storage device 24 with the new storage device 24' without disrupting the host 22. At the end of the migration, the storage device 24 is completely replaced by the new storage device 24'. Also, during the migration, it is important to always maintain a disaster recovery position in which the host 22 can resume operation if either the storage device 24 or the new storage device 24' fails during the migration. Note that all of these criteria are met in the solution set forth in U.S. Pat. No. 7,685,129 to LeCrone, et al. (hereinafter, "the '129 patent"), which is incorporated by reference herein. However, the solution provided in the '129 patent also requires that the host 22 participate in the migration by reading data from the source (i.e., the storage device 24) and writing the data to the target (i.e., the new storage device 24'). In some cases, it may be impractical or undesirable to have all or nearly all of the data pass through the host 22. The system described herein migrates data from the source to the target without having the data pass through the host 22.

The migration may include providing the new remote storage device 26' to replace the remote storage device 26. In such a case, the new storage device 24' and the new remote storage device 26' are configured in a manner similar to the configuration of the storage device 24 and the remote storage device 26 so that data written to the new storage device 24' is copied to the new remote storage device 26'. Eventually, all of the data migrated to the new storage device 24' will be replicated to the new remote storage device 26'. In other embodiments, only the new storage device 24' for the migration is provided and the remote storage device 26 is retained, in which case the new storage device 24' replicates data to the remote storage device 26. This is illustrated by the dashed arrow between the new storage device 24' and the remote storage device 26 in FIG. 3. The different permutations are described in more detail elsewhere herein. Note that, in other instances, it is possible to use the system described herein to migrate one or more file extents rather than migrating data from a storage device prior to replacing the storage device.

Figure 4:
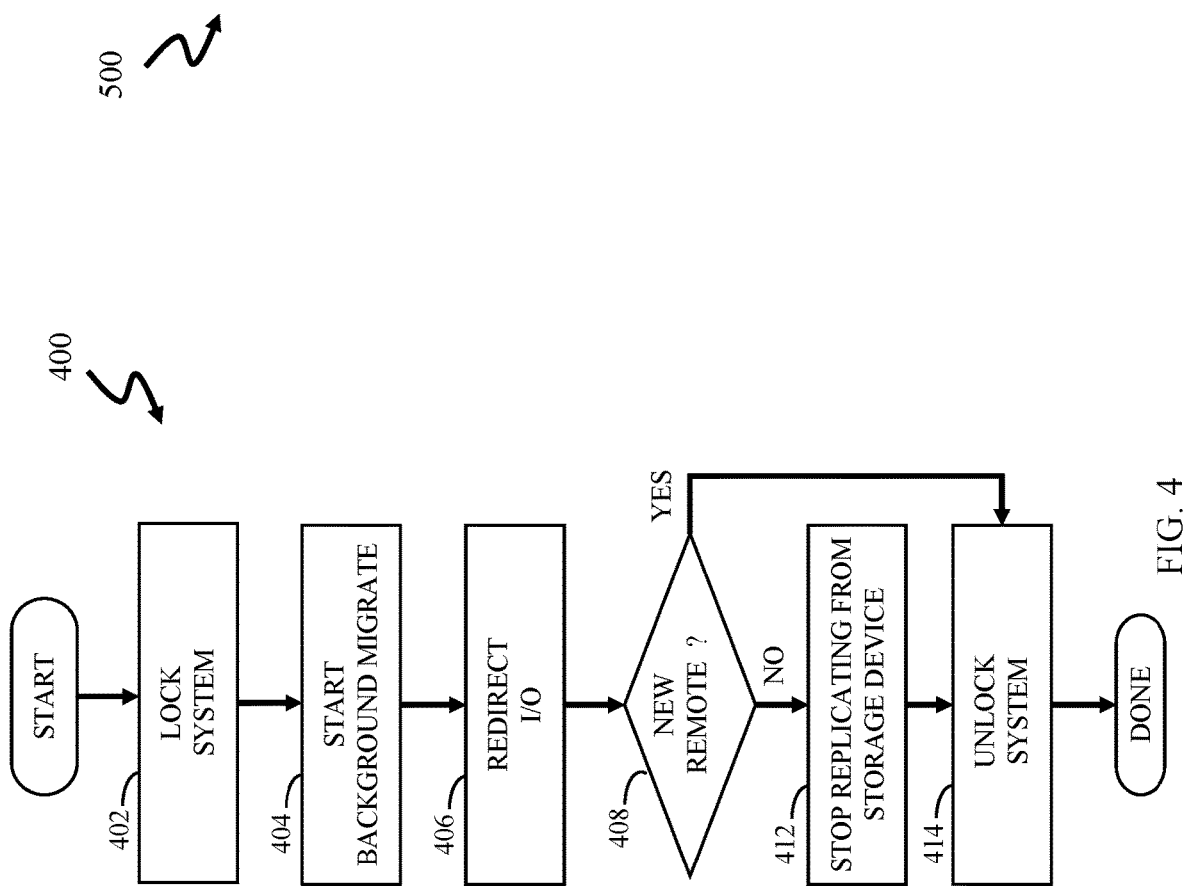
FIG. 4 is a flow diagram illustrating processing performed in connection with setting up a system to begin migrating data according to an embodiment of the system described herein.

Referring to FIG. 4, a flow diagram 400 illustrates processing performed in connection with setting up the system 100 of FIG. 3 to begin migrating data from the storage device 24 to the new storage device 24'. Processing begins at a step 402 where the system is locked to prevent writing data while the configuration is being adjusted. Although locking the system at the step 402 is arguably disruptive, it is noted that the system 100 remains locked for only so long as it takes to adjust the configuration, which is automated and involves only modifying metadata, and thus should be relatively quick (e.g., under a few seconds). Thus, locking the system 100 while the configuration is being adjusted for migration is not considered disruptive. Following the step 402 is a step 404 where a background migration process is started. The background migration process is described in more detail elsewhere herein.

Following the step 404 is a step 406 where I/O operations are redirected so that the host 22 performs I/O operations with the new storage device 24'. After redirecting the I/O operations, the host 22 no longer performs I/O operations with the storage device 24. In an embodiment herein, redirection is performed by modifying metadata used for I/O operations, such as metadata used in device drivers (e.g., changing control block data), so that I/O access of logical devices by applications on the host 22 does not change, but the mapping of the logical devices to physical devices does change. A mechanism for performing this is described in more detail, for example, in U.S. Pat. No. 7,685,129 to LeCrone, et al., which is incorporated by reference herein. Of course, any appropriate mechanism for redirecting I/O operations may be used at the step 406.

Following the step 406 is a test step 408 where it is determined whether the new remote storage device 26' is being provided in connection with the migration. As discussed elsewhere herein, in some instances, only the new storage device 24' is provided in connection with the migration while in other instances both the new storage device 24' and the new remote storage device 26' are provided. If it is determined at the test step 408 that only the new storage device 24' is being provided, then control transfers from the test step 408 to a step 412 where the configuration is adjusted to stop replication from the storage device 24 to the remote storage device 26 since, going forward, data will be replicated from the new storage device 24' to the remote storage device 26. In instances where the new storage device 26' is being provided, then replication from the storage device 24 to the new storage device 26 is maintained. Note, by the way, that any time prior to stopping replication at the step 412, it would be possible to redirect I/O back to the storage device 24 in case of a failure of the new storage device 24'. Following the step 412 is a step 414, which is also reached from the test step 408 if the new remote storage device 26' is being provided in connection with the migration. At the step 414, the system is unlocked so that I/O operations from the host 22 may resume. Following the step 414, processing is complete.

Figure 5:
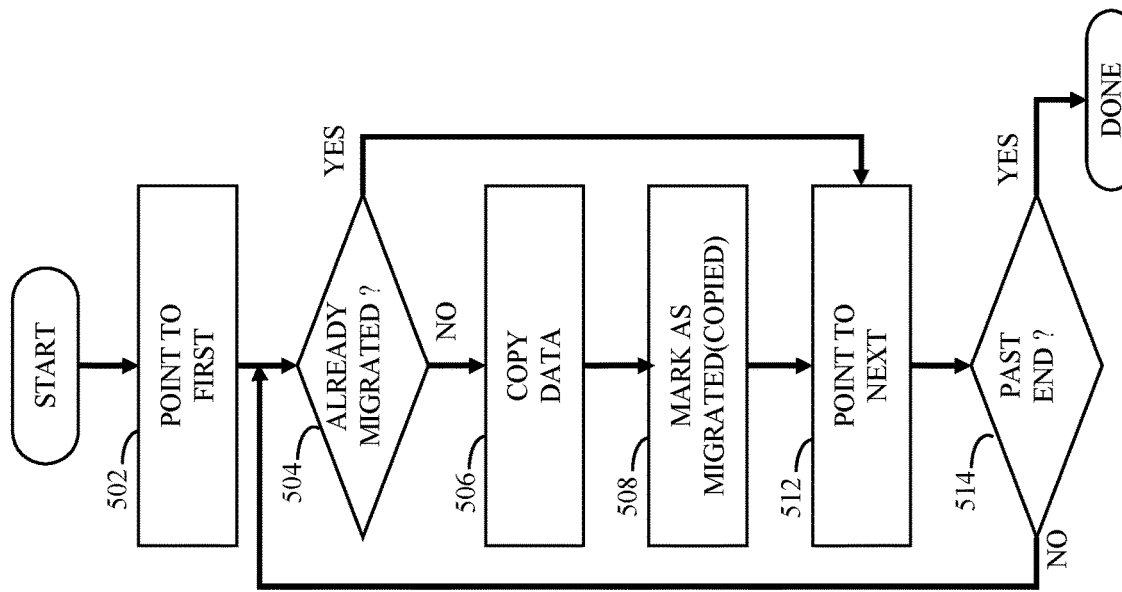
FIG. 5 is a flow diagram illustrating processing performed in connection with migrating data according to an embodiment of the system described herein.

Referring to FIG. 5, a flow diagram 500 illustrates processing performed by the new storage device 24' (or possibly the new storage device 24) in connection with performing the background migration process that was initiated at the step 404 in FIG. 4, discussed above. The background migration process may be performed independently of any I/O operations by the host 22. In an embodiment herein, the new storage device 24' provides channel emulation to appear as a host to the storage device 24. Thus, the migration may be performed by the new storage device 24' performing read requests to the storage device 24, which services the read requests in the same way that host read requests are serviced. Thus, data that is transferred between the storage device 24 and the new storage device 24' does not generally pass through the host 22, although the host 22 may be involved when specific data is read or written during I/O operations that are performed while data is being migrated, as described in more detail elsewhere herein. Note also that the processing illustrated by the flow diagram 500 is only started at the step 404, but is not completed. Thus, it is expected that most of the processing illustrated by the flow diagram 500 will be performed after the processing illustrated by the flow diagram 400 has completed. Accordingly, the background migration occurs after the system 100 is unlocked at the step 414 and therefore occurs while the host 22 is performing I/O operations.

Processing begins at a first step 502 where a pointer that iterates through all of the data is set to point to a first portion (block, track, etc.) of data being migrated from the storage device 24 to the new storage device 24'. Following the step 502 is a test step 504 where it is determined whether the data indicated by the pointer has already been migrated (copied) to the new storage device. As discussed elsewhere herein, there are instances where data may be copied from the storage device 24 to the new storage device 24' prior to the data being reached by the background migration process. If it is determined at the test step 504 that data has not already been copied, then control transfers from the test step 504 to a step 506 where the data is migrated (copied) from the storage device 24 to the new storage device 24'. Following the step 506 is a step 508 where the data portion is marked as having already been migrated. As discussed in more detail elsewhere herein, the indication that data has already been migrated is useful when handling subsequent write operations by the host 22. Note that the marking may occur at the storage device 24, at the new storage device 24', or both, and that the marking may be provided by any appropriate mechanism, such as modifying metadata corresponding to the portion being marked. In an embodiment, an SDDF mechanism like that described in U.S. Pat. No. 9,558,083 to LeCrone, et al., mentioned above, may be used.

Following the step 508 is a step 512 where the pointer that iterates through the data on the storage device 24 is incremented. Note that the step 512 is reached directly from the test step 504 if it is determined at the test step 504 that the data portion indicated by the pointer had already been copied. Following the step 512 is a test step 514 where it is determined if the pointer points past the end (i.e., all of the data has been processed). If so, then processing is complete. Otherwise, control passes from the test step 514 back to the step 504, discussed above, for another iteration. Note that, once the processing is complete, the migration operation has completed and, except for any pending operations (discussed in more detail elsewhere herein) the storage device 24 (and possibly the remote storage device 26) may be removed from the system 100 and operation may continue using the new storage device 24'.

Figures 6, 7:
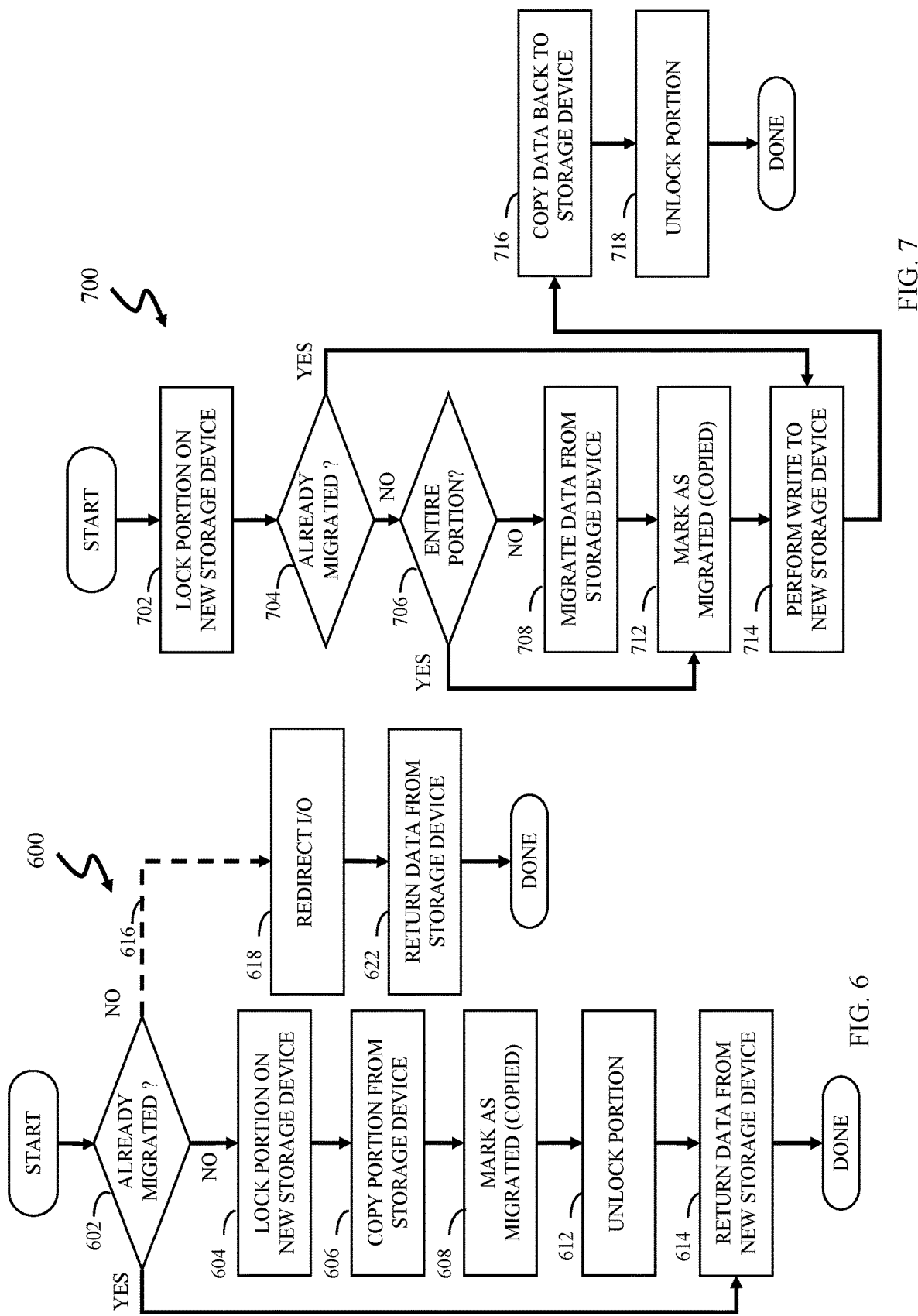
FIG. 6 is a flow diagram illustrating processing performed in connection with a host reading data during migration according to an embodiment of the system described herein.
FIG. 7 is a flow diagram illustrating processing performed in connection with a host writing data during migration according to an embodiment of the system described herein.

Referring to FIG. 6, a flow diagram 600 illustrates processing performed at the new storage device 24' in connection with receiving a read request from the host 22. Processing begins at a first step 602 where it is determined if the data being read has already been migrated (copied) from the storage device 24. If not, then control transfers from the test step 602 to a step 604 where the data portion (track, block, etc.) being read is locked on the new storage device 24' to prevent other processes/devices from altering the data. Following the step 604 is a step 606 where the data portion is copied (migrated) from the storage device 24 to the new storage device 24'. Following the step 606 is a step 608 where the data that was copied (migrated) is marked as having been copied (migrated), as discussed in more detail elsewhere herein. Following the step 608 is a step 612 where the data portion is unlocked at the new storage device 24'. Following the step 612 is a step 614 where the read request is serviced by providing the requested data from the new storage device 24'. Note that the step 614 is reached directly from the test step 602 if it is determined at the test step 602 that the data had already been migrated (copied) from the storage device 24 to the new storage device 24'. Following the step 614, processing is complete.

Alternatively, it is possible to return data from the storage device 24 in response to a read request for data that has not yet been migrated to the new storage device 24' An alternative path 616 illustrates this. If it is determined at the test step 602 that data being read has not yet been migrated, then control transfers from the test step 602 along the alternative path 616 to a step 618 where I/O is redirected to the storage device 24. Following the step 618 is a step 622 where the data is returned from the storage device 24. Following the step 622, processing is complete. In some embodiments, reading the data from the storage device 24 may cause accelerated migration of the data (e.g., in connection with the step 618) so that, in an expected subsequent read operation, the data will have already been migrated.

Referring to FIG. 7, a flow diagram 700 illustrates processing performed by the new storage device 24' in connection with a write operation being performed by the host 22 to the new storage device 24'. Processing begins at a step 702 where the data portion (track, block, etc.) being written is locked on the new storage device 24' to prevent other processes/devices from altering the data. Following the step 702 is a test step 704 where it is determined if the data portion being written has already been migrated (copied) from the storage device 24 to the new storage device 24'. If not, then control transfers from the test step 704 to a test step 706 where it is determined if the write being performed overwrites the entire portion (block, track, etc.). Note that overwriting the entire portion includes instructions that clear the entire portion, instructions that fill the entire portion with a specific pattern, etc. as well as writes that fill/use the entire portion (e.g., writing an entire track's worth of data). If it is determined at the test step 706 that the write operation does not fill the entire portion, then control transfers from the step 706 to a step 708 where data for the portion is copied from the storage device 24 to the new storage device 24'. Following the step 708 is a step 712 where the portion is marked as having been copied (migrated). Note that the step 712 is reached directly from the test step 706 if it is determined at the step 706 that the entire portion is being written.

Following the step 712 is a step 714 where the write operation is performed by writing the data from the host 22 to the new storage device 24'. Following the step 714 is a step 716 where the data that was written to the new storage device 24' at the step 714 is copied back to the storage device 24. In other embodiments, it may be possible to replace the step 716 with different processing in which, instead of copying data from the new storage device 24' to the storage device 24, the host 22 writes data directly to the storage device 24. Following the step 716, the data for the portion at the storage device 24 is a replica of the data for the portion at the new storage device 24'. Note that, if this is performed for all of the data writes during the migration, then the storage device 24 and the remote storage device 26 will always contain up-to-date data during the migration and the remote storage device 26 will maintain a disaster recovery position for the system 100 throughout the migration process. Following the step 716 is a step 718 where the portion of the new storage device 24' is unlocked, thus causing the write operation to complete and the host 22 to receive an acknowledgement of the write operation. Accordingly, the host 22 does not receive an acknowledgement of a write operation until the data has been successfully written to the storage device 24. Thus, a disaster recovery position is always maintained since the remote storage device 26 is always a mirror of the storage device, irrespective of whether the new storage device 26' is being provided in connection with the migration process. Following the step 718, processing is complete.

Note that the processing illustrated by the flow diagram 700 of FIG. 7 may be applied to any quantum of data, including a dataset, a track, a collection of separate volumes, etc.

Once the background migration process illustrated by the flow diagram 400 has completed, the new storage device 24' essentially contains the same data as the storage device 24, where any differences are the result of recent writes by the host 22 to the new storage device 24' that have not yet been copied to the storage device 24. However, the recent writes will have been copied to the new remote storage device 26' if the migration included providing the new remote storage device 26' or will have been provided to the remote storage device 26 if the remote storage device 26 is being used as a replica of the new storage device 24'. Thus, once the migration is complete, either the new remote storage device 26' (if it is used) or the remote storage device 26 maintains a disaster recovery position and the storage device 24 may be eliminated/removed, in which case the connections between the storage device 24 and the new storage device 24' can be removed and the processing illustrated by the flow diagrams 600, 700 is no longer necessary.

In some instances, it may be desirable to reduce the amount of overhead and extra work for writing data to the new storage device 24' at a location where data has not yet been migrated. Note that this overhead and extra work includes copying data from the storage device 24 to the new storage device 24', replicating the copied data from the new storage device 24' to the new remote storage device 26', performing the write from the host 22 to the new storage device 24', copying the data just written by the host 22 from the new storage device 24' to the storage device 24, replicating the data just written by the host 22 from the storage device 24 to the remote storage device 26, and replicating the data just written by the host 22 from the new storage device 24' to the new remote storage device 26'. Of course, the overhead is less in instances where the data had already been migrated from the storage device 24 to the new storage device 24' prior to the write by the host 22. The following optimization takes advantage of this.

Referring to FIG. 8, a flow diagram 400' illustrates processing like that of the flow diagram 400, discussed above, except that, prior to initiating the background data migration at the step 404, a step 802 is performed where a complete data copy is performed to copy data from the storage device 24 to the new storage device 24'. The data that has been copied is marked using, for example, SDDF, or another appropriate mechanism, as explained elsewhere herein. While data is being copied from the storage device 24 to the new storage device 24' at the step 802, the system is not locked and the host 22 performs conventional I/O operations with the storage device 24, except that a write operation following data having already been transferred to the new storage device 24' is handled in a special way, as explained elsewhere herein. The copy operation at the step 802 may use processing like that illustrated by the flow diagram 500 of FIG. 5, except that it may not be necessary to perform the test at the step 504 since it is expected that none of the data will have been previously migrated (copied) from the storage device 24 to the new storage device 24', at least the first time through. Note that, in some embodiments, it may be possible to perform the step 802 repeatedly (a number of times) prior to locking and reconfiguring the system 100 in connection with the data migration. Performing the step 802 repeatedly (and thus performing the processing illustrated by the flow diagram 500 of FIG. 5 repeatedly) may reduce the amount of data requiring special handling during the migration.

Referring to FIG. 9, a flow diagram 900 illustrates processing performed in connection with a write operation to the storage device 24 that occurs while the data is being copied from the storage device 24 to the new storage device 24' (i.e., prior to the system being locked at the step 402 and being subsequently reconfigured). Processing begins at a test step 902 where it is determined if the data portion (block, track, etc.) being written is marked, indicating that the portion has already been copied from the storage device 24 to the new storage device 24'. If so, then control transfers from the test step 902 to a step 904 where the mark is cleared (e.g., the SDDF mechanism is set to indicate that the data has not been copied from the storage device 24 to the new storage device 24'). Following the step 904 is a step 906 where the data is written in a conventional fashion to the storage device 24. Note that the step 906 may be reached directly from the step 902 if it is determined at the step 902 that the data portion being written is not marked. Following the step 906, processing is complete.

Referring to FIG. 10, a flow diagram 1000 illustrates an alternative embodiment of processing performed in connection with a write operation to the storage device 24 that occurs while the data is being copied from the storage device 24 to the new storage device 24' (i.e., prior to the system being locked at the step 402 and being subsequently reconfigured). Processing begins at a test step 1002 where it is determined if the data portion (block, track, etc.) being written is marked, indicating that the portion has already been copied from the storage device 24 to the new storage device 24'. If so, then control transfers from the test step 1002 to a step 1004 where the data is written to the new storage device 24'. Following the step 1004 is a step 1006 where the data is written in a conventional fashion to the storage device 24. Note that the step 1006 may be reached directly from the step 1002 if it is determined at the step 1002 that the data portion being written is not marked. Note also that writing the data to both the storage device 24 and the new storage device 24' causes the data portion to be the same on both of the storage devices 24, 24'. Following the step 1006, processing is complete.

In some instances, it may not be desirable or practical to make any alterations to the storage device 24 prior to initiating the migration process. In such a case, the channel ports of the storage device 24 may be configured in a conventional manner to accept read requests from the new storage device 24' where the new storage device 24' appears as a host to the storage device 24 (i.e., the new storage device issues read requests and receives data in the same way that a host would issue read commands and receive data). Processes on the host 22 may be used to keep track of SDDF information and may orchestrate and monitor the data transfer from the storage device 24 to the new storage device 24'. Of course, in such a case, the data would still be transferred directly between the storage device 24 and the new storage device 24' without involving the host 22.

Various embodiments discussed herein may be combined with each other in appropriate combinations in connection with the system described herein. Additionally, in some instances, the order of steps in the flow diagrams, flowcharts and/or described flow processing may be modified, where appropriate. Further, various aspects of the system described herein may be implemented using software, hardware, a combination of software and hardware and/or other computer-implemented modules or devices having the described features and performing the described functions. The system may further include a display and/or other computer components for providing a suitable interface with a user and/or with other computers.

Software implementations of the system described herein may include executable code that is stored in a non-transitory computer-readable medium and executed by one or more processors. The computer-readable medium may include volatile memory and/or non-volatile memory, and may include, for example, a computer hard drive, ROM, RAM, flash memory, portable computer storage media such as a CD-ROM, a DVD-ROM, an SD card, a flash drive or other drive with, for example, a universal serial bus (USB) interface, and/or any other appropriate tangible or non-transitory computer-readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of migrating data from a first storage device to a second storage device, comprising:
   coupling a host computer to the first storage device and the second storage device;
   causing the host computer to transition from performing input/output (I/O) operations with the first storage device to performing I/O operations with the second storage device by modifying metadata used for I/O operations to change a mapping of logical devices to physical devices;
   migrating data from the first storage device to the second storage device independently of any I/O operations by the host computer; and
   acknowledging to the host computer completing of a data write operation by unlocking access to the second storage device only after the data has been successfully written to both the first storage device and the second storage device.

2. A method, according to claim 1, wherein modifying metadata includes changing control block information in device drivers.

3. A method, according to claim 1, wherein the data is written by the host computer to both the first storage device and the second storage device.

4. A method, according to claim 1, wherein the data is written by the host computer to the second storage device only and the data is copied from the second storage device to the first storage device.

5. A method, according to claim 4, wherein other data from a portion of a same area of the first storage device is copied from the first storage device to the second storage device prior to the host computer writing the data to the second storage device.

6. A method, according to claim 5, wherein copying the other data is performed in connection with migrating the data from the first storage device to the second storage device.

7. A method, according to claim 5, wherein copying the other data is performed independently of migrating the data from the first storage device to the second storage device.

8. A method, according to claim 5, wherein the portion is a track.

9. A method, according to claim 5, wherein the portion is locked prior to copying the other data.

10. A non-transitory computer readable medium containing software that migrates data from a first storage device to a second storage device that are both coupled to a host computer, the software comprising:
    executable code that causes the host computer to transition from performing input/output (I/O) operations with the first storage device to performing I/O operations with the second storage device by modifying metadata used for I/O operations to change a mapping of logical devices to physical devices;
    executable code that migrates data from the first storage device to the second storage device independently of any I/O operations by the host computer; and
    executable code that acknowledges to the host computer completing of a data write operation by unlocking access to the second storage device only after the data has been successfully written to both the first storage device and the second storage device.

11. A non-transitory computer readable medium, according to claim 10, wherein modifying metadata includes changing control block information in device drivers.

12. A non-transitory computer readable medium, according to claim 10, wherein the data is written by the host computer to both the first storage device and the second storage device.

13. A non-transitory computer readable medium, according to claim 10, wherein the data is written by the host computer to the second storage device only and the data is copied from the second storage device to the first storage device.

14. A non-transitory computer readable medium, according to claim 13, wherein other data from a portion of a same area of the first storage device is copied from the first storage device to the second storage device prior to the host writing the data to the second storage device.

15. A non-transitory computer readable medium, according to claim 14, wherein copying the other data is performed in connection with migrating the data from the first storage device to the second storage device.

16. A non-transitory computer readable medium, according to claim 14, wherein copying the other data is performed independently of migrating the data from the first storage device to the second storage device.

17. A non-transitory computer readable medium, according to claim 14, wherein the portion is a track.

18. A non-transitory computer readable medium, according to claim 14, wherein the portion is locked prior to copying the other data.

* * * * *